ure which is sufficiently high to expel organic constituents in the form of a combustible gas for as long as such a gas continues to be generated. The combustible gas is combusted continuously at a location external of the reactor vessel, and the residual content of the reactor vessel is taken out in a molten and/or non-molten state. During at least a part of the expulsion process, air or gas containing free oxygen can be supplied to the reactor vessel through a lance in sub-stoichiometric amount.

11 Claims, 1 Drawing Figure

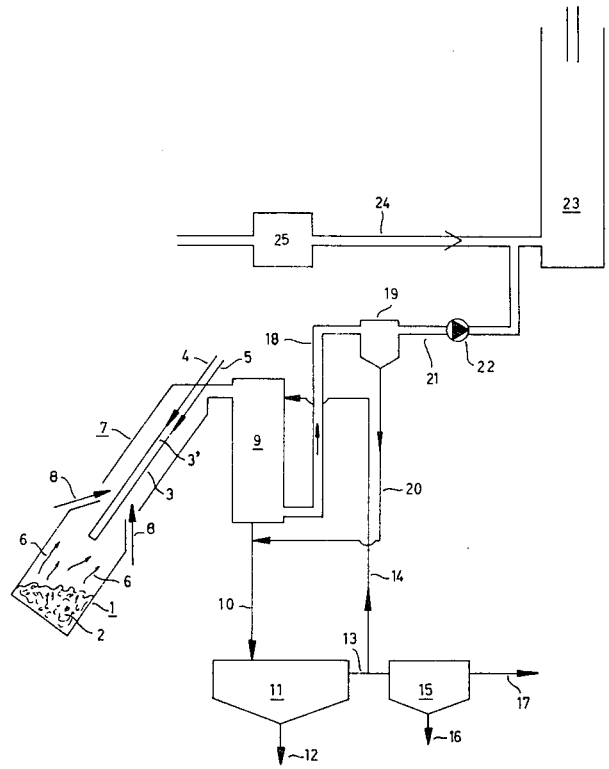

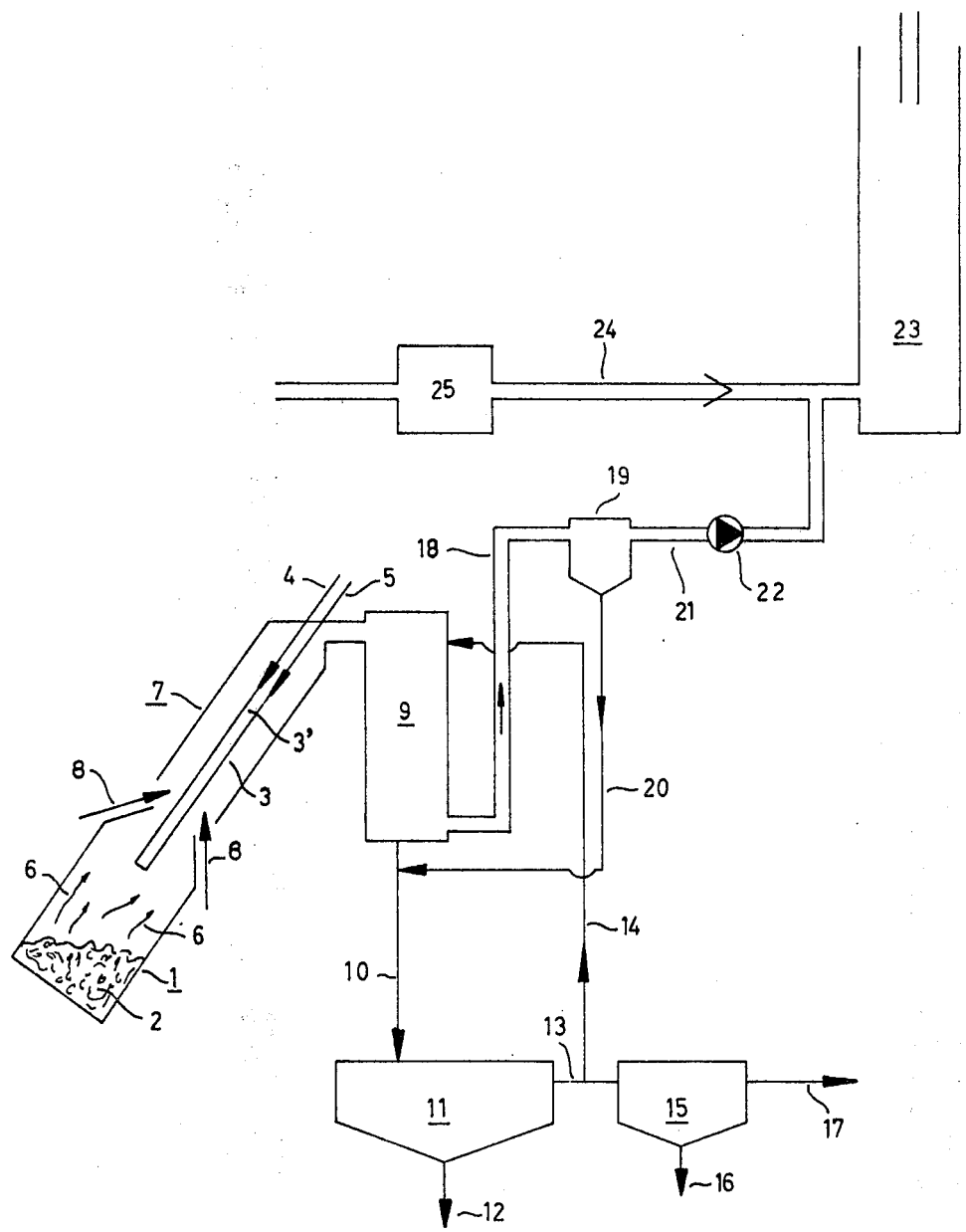

METHOD FOR WORKING-UP METAL-CONTAINING WASTE PRODUCTS

The present invention relates to a method for converting metal-containing waste products which contain a high percentage of organic substituents, such as plastics, rubber, paper, oil, tar and greases, into a product from which metal can be readily recovered. In particular, the invention relates to a method for working-up combustible copper scrap, such as cable scrap and scrap electronic equipment, which scrap also often contains considerable amounts of noble metals. When processing scrap material of the aforementioned kind, it is particularly desirable to reduce losses to a minimum, both with respect to economy and to the emission of harmful substances to the environment.

For many years the main method of treating such materials has been to subject them to different combustion processes. Practically all materials of the kind in question found on the market can be effectively treated by applying these known combustion methods. The most common method applied today is one in which the material is fired in heaps in the open. Apart from the obvious environmental disadvantages created by such a method, which because of the demands placed upon the care and protection of environment, limit, or completely exclude the application of such a method in certain countries, the method results in large losses of the more noble metals, such as copper and silver, as a result of the volatile chlorides formed by the reaction between the exposed metal, the oxygen in the air, which flows freely through the heap, and the hydrochloric acid formed when burning the organic material. Moreover, when too much oxygen is present, the copper is strongly oxidised, and because of the copper oxide formed, the metal can be difficult to recover. In the open combustion of cable scrap, the amount of copper lost varies in dependence on the dimensions of the wires in the cables, but reaches to between 2% and up to 5-10% by weight.

The scrap may also be burned in a furnace, the main advantage being that it is possible to control the amount of air introduced. In spite of this, however, it is not possible to reduce the metal losses to the extent desired, since it is necessary to sustain the combustion process. Losses in the order of magnitude of 1-2% is an example of the best results obtainable when using existing scrap-burning furnaces at Rönnskärsverken, Boliden's smelting plant in the north of Sweden. The combustion methods are also restricted by the choice of material to be worked-up, since high contents of Al, Pb and Mg cannot be tolerated.

The oxidation of metal when burning metal scrap may be reduced if, in accordance with the method described in GB,A, No. 1 370 071, the burning process is carried out in counter-flow during passage through a rotary kiln. In this method the scrap material is first in the upper end of the kiln subjected to an oxidation at a temperature below the actual oxidation temperature of the metal or alloy so as to eliminate most of the organic material of the scrap, while the remaining part is eliminated during the further passage of the scrap towards the warmer and more and more reducing atmosphere prevailing at the lower end, the discharge end of the kiln. The method is, however, only disclosed in connection with working-up metal chips and shavings and similar scrap from workshops, which scrap in this connection only contains minor amounts of organic matters. Methods of that sort probably must be limited to the treatment of relatively pure scrap material and they have not enough capacity for the treatment of scrap containing substantial amounts of organic material, such as cable scrap.

In later years other methods, less harmful to the environment, have been suggested as a replacement for the outmoded combustion methods, and many industrialists have also experimented with practical methods, such as mechanical, cryo-technical, pyrometallurgical and hydrometallurgical methods.

Mechanical methods are favourable to the environment, and often result in a product, a metal granulate, which in the continued work-up of the material can be dispensed to respective processes via hoppers, bins and conveyor belts. As an example of the mechanical methods can be mentioned scaling or peeling, a work-intensive method, best suited to those cables with which the insulating layer can be slit and peeled from the copper wire. Another proposed mechanical method is granulation, in which the scrap is cut up to a given particle size and then processed, for example, in a stream of air. In granulation, the metal losses are estimated to be about 1%. Processing can also be effected in the form of a sorting process, for example in an upwardly moving steam of water. This creates difficulties, however, since the turbulent flow of water can result in undesirable mixing of the material fractions. Any iron and steel present in the scrap material results in an abnormally high wear on the knives in the granulating apparatus, and tacky constituents cause the granulated material to conglommerate. Consequently, the usefulness of the mechanical methods is greatly restricted, because of the large amounts of iron, stainless steel etc. contained in the material, and because oil, tar and grease cannot be treated.

Of the cryo-technical methods, the one most discussed is cryo-grinding. In this case, before being ground, the scrap is chilled with liquid nitrogen to a temperature of between $-80°$ and $-100°$ C. The various constituents of the scrap are then separated from each other, using for this purpose air or water as with the mechanical methods. Cryo-grinding has the same limitations as the mechanical methods, the major difference being that the amount of electrical energy required to grind the scrap is only 20–30% of that required in normal grinding operations. Another cryo-technical method, although hitherto untested, is one in which the scrap is distinguished ultra-sonically, subsequent to being chilled.

Known pyro-and hydro-metallurgical methods include processes in which the waste material is subjected to a smelting or leaching operation, in which either the metal content of the scrap or the organic material can be leached out. One important advantage afforded by such methods is that working-up of the scrap can be incorporated, in a natural fashion, together with the metallic processes to which the scrap is subsequently subjected, among other things because the concentrated material is obtained in a form which is favourable to the further manufacture of metal from the scrap and in a form which enables it to be used directly. In a known scrap-smelting plant at AMAX in Carteret, U.S.A., copper scrap is burned and melted down continuously in cupola furnaces and the molten copper then passed to an anode furnace for further treatment. These methods, however, are associated with serious disadvantages, in that scrap containing organic material can only be charged to the cupola furnaces in limited quantities. More specifically, only 4–5% of the scrap charged to a cupola furnace can comprise organic material.

Leaching methods for recovering metals from scrap of the kind before-mentioned have long been known. These methods, however, have hitherto only been proposed, and have not been tested with respect to upgrading materials of the kind in question. For example, copper can be leached with sulphuric acid, chlorine gas, ammoniacal solutions, cyanide or chlorine solutions. If gold and silver are also to be leached out, it is necessary to apply a cyanide leaching process or a chlorine-gas leaching process in chloride solution, although these methods are not particularly attractive from the environmental aspect. When subjecting metal scrap to a leaching process, it is also necessary to pretreat the scrap in a manner to at least partially expose the metal surfaces, whereafter the scrap is considered to be leached with respect to a percentage of the copper, silver and gold present, which pass to cementation. The leaching residues are then treated with chlorine gas, to leach out the remainder of the metal content. The chlorine gas and hydrogen gas necessary to the process are produced in a chlorine-alkali-cell. In addition to the complicated procedural steps which must be applied, such leading methods have a limited applicability, because relatively constant conditions must prevail during the process, and hence a unitary material must be selected. It has also been suggested that solvents can be used for removing PVC from cables and wires, although there is yet no justification for applying this method in practice.

One interesting alternative to the old combustion methods is pyrolysis, the nearest comparison to which is gasification or thermal degradation. In a pyrolysis process, the material can be heated directly or indirectly, in order to split-off or expel the organic substances.

Organic substances may for example by partial gasification in a two-stage process be converted to coke and exhaust gases as disclosed in GB,A, No. 1 437 224, wherein organic scrap material, such as car tires, in a first stage is partially gasified in a pyrolysis reactor to form coke and a burnable gas and whereafter in a second stage said burnable gas is combusted in a connecting combustion chamber to form a soot-free and odourless waste gas. An apparatus for soot-free combustion of metal containing scrap, such as cable scrap, is disclosed in DE,B, No. 1 146 661. The apparatus provides a two-stage process similar to the above described to be utilized for the treatment of metal containing scrap. Other suggested pyrolysis methods are intended to recover organic material in the form of oil, tar or gas. The majority of these methods employ an indirect heat transfer, whereby in a typical method the scrap charge is placed in a basket arranged in a "sealed" container. The container is placed in a furnace, where the charge is heated indirectly to a temperature of 400°–500° C. using oil or electrical energy as the heat source. In the thermal degradation of organic material, gasified hydrocarbon build-up an overpressure, which is controlled by tapping-off gas and passing the gas to a condenser. Hydrochloric acid is separated either in a washing plant or in a condenser, together with condensed hydrocarbons. Hydrocarbons having a higher boiling point are tapped-off as a tar fraction in the bottom of the container. Even though such methods afford a number of advantages, these being the absence of harmful waste gases, only slight copper-oxide formations due to the inert atmosphere, the recovery of organic material and low metal loss, they still cannot be considered sufficiently attractive, since they are extremely costly and have a particularly limited capacity, 3–5 tons of scrap per day being considered a typical figure for a plant of average size.

It is possible that higher capacities can be achieved with pyrolysis methods which employ a direct heat transfer by gas recirculation. By these methods the combustible substances and gases emitted may be burned together with oil in a combustion chamber connected after the furnace. Gases leaving the combuston chamber are recycled and mixed with recycled, cold washed gas originating from a subsequent gas-washing plant, the gases being cooled to a furnace input temperature of approximately 500° C. Approximately 15–30% of the gas generated in the combustion chamber is transferred to the plant chimney, subsequent to removing dust from the gas. Among the advantages afforded by such methods over other pyrolysis methods is that the hydrochloric-acid content can be kept low and the amount of waste gases which need to be discharged is small because of the recycling of the gases, and hence the dimensions of the gas-purifying plant are smaller than would otherwise be the case.

One method of similar art, in which the treatment or metallic scrap is carried out in an inclined rotary kiln is disclosed in GB,A, No. 1 598 689.

The pyrolysis methods hitherto used or proposed for working-up metal scrap also have a number of serious disadvantages, however, among other things from the material-handling view point. As before indicated, the capacity of each pyrolysis unit is greatly limited, and hence it is necessary to install a plurality of pyrolysis furnaces and to operate said furnaces simultaneously, if a sufficiently high working capacity is to be obtained, which capacity, in typical cases, reaches to 50–100 tons of scrap each day. In addition, the material must be pre-treated to a certain extent, since excessively large coils, cable drums or apparatus cabinets cannot be charged directly to the furnace. Neither is the pyrolyzed material particularly suitable for treatment in subsequent metal-recovery stages, for example in copper converters, since considerable quantities of dust are included in the material, pyrolyzed at low temperatures, and in burned scrap, as above indicated.

When practicing the method according to the present invention it has been found possible to eliminate the aforementioned problems with regard to the low capacity of the processes employed and in regard of the handling of the scrap material when working-up metal scrap containing organic substances, while retaining those advantages obtained when applying, for example, the pyrolysis methods, and also to produce a product which is more favourable to subsequent treatment processes than the products obtained when applying combustion or pyrolysis methods.

The expulsion of the organic material is according to the invention effected in an inclined rotating vessel arranged for rotation about its longitudinal axis and provided with a bottom at one end thereof and an opening at the other end common for supply and discharge, for example a reactor of the same kind as a top-blown rotary converter, a so-called TBRC or Kaldo-converter. By using reactor vessels of the above mentioned kind the removal of the organic material from the metal fractions and combustion of the resultant combustible process gases can be carried out at a surprisingly high production capacity and with substantially lower dust emission. In addition, combustion of the process gas can be readily controlled, so that optimal combustion conditions can be constantly ensured. It has been found that by actuating the material by rotating the reactor vessel during the expulsion process, i.e. the removal of organic substances from the scrap, not only is the expulsion process accelerated to a substantial extent but the flow of process gas generated can be controlled to an extent higherto unthought of. This also enables the subsequent combustion of the gas to be readily controlled within optimal limits, for example in order to destroy gaseous organic substances generated during said expulsion process, said gases often being toxic or obnoxious. Thus, it has been found possible, with only minor adjustments to the speed at which the reactor vessel rotates during the expulsion process, to generate an approximately constant amount of combustible gas per unit of time, practically to the end of the expulsion process. The rotating speed of the vessel is normally within a range of from about 1 to about 5 rpm, but the optimal speed may also be less than 1 rpm or more than 5 rpm depending on the composition of the material being treated. If the material contains only minor amounts of organic substances a fast rotational speed may be requisite, whereas a rotational speed in excess of 5 rpm may be used for treating materials containing only minor quantities of organic matter. When practicing the method according to the invention, expulsion of organic constituents can be effected as a normal pyrolysis process without supplying oxygen during the course of the expulsion process, although it is possible, and in certain cases advantageously—particularly during the final phase of said expulsion process—to supply air or oxygen gas, if so desired, at least in minor quantities, in order to facilitate and accelerate said expulsion process. The amount of oxygen supplied should, however, be limited to a sub-stoichiometric amount relative to the organic substances present, so that the organic substances are only partially combusted. If so desired, material treated in this fashion can be rapidly melted down in the reactor, at least partially, so as to produce a product which can be more readily handled when subjected to a further metal-producing process. If the product is to be melted, the reactor temperature is raised by means of the same burners as those used at the beginning of the treatment stage for initiating the expulsion of said organic substances. If the product contains substantial quantities of copper, the temperature should be raised to at least 1050°-1100° C., such that the major part of the copper contained by the product is melted down, whereafter the reactor contents are emptied therefrom, preferably in a ladle having a form such that "the smelt" can be readily removed after solidifying. All dust products in the treated material are bound, in this way, in the solidified melt, which can then be charged as such to a conventional copper converter, in order to upgrade the metal content. In this way, those problems hitherto associated with the handling of burned scrap and pyrolysis scrap in further metal-recovery processes are solved, at least to a substantial degree.

The invention will now be described in more detail with reference to a preferred embodiment carried out in the plant illustrated in the drawing, the reactor employed being a Kaldo converter. The FIGURE illustrates diagrammatically a plant, including a gas-purification system, in which scrap is upgraded in accordance with the invention. The illustrated plant has a capacity of 70-100 tons of scrap per day. The scrap, which can be charged to the furnace without requiring any significant pretreatment, is loaded onto skips and charged to a reactor vessel 1 in rearwardly inclined position (not shown) (a Kaldo type converter). The charge, referenced 2 in the FIGURE, is heated while rotating the reactor vessel, usually at a speed of about 1-5 rpm with vessel in the illustrated position, by means of an axially movable burner 3, to which oil and oxygen gas are supplied through lines 4 and 5. The oil is normally charged at a rate of 2-5 l/min. The time taken to heat the charge sufficiently, i.e. to a temperature of 600°-800° C., is about 5-10 minutes, after which time organic, combustible gas starts to generate, as shown by the arrows 6. The combustible gas is ignited by means of the burner 3, which at this stage has its nozzle end located in an upper position identified by the reference 3 in the FIGURE, within the confines of a gas hood 7 which functions as a combustion chamber and to which secondary air of combustion is fed through a gap defined by the mouth of the converter and the opening of the gas hood opposite thereto, as shown by the arrows 8. The burner 3 is suitably operative during the first 10-20 minutes of the expulsion process, since expulsion is greatest during this period and the combustion chamber is cold, which means that "under normal conditions" after-combustion in the combustion chamber will not be as effective, whereat the generation of dust and the occurrence of obnoxious odours may also prevail. If desired, oxygen (e.g. air) and optionally also oil may be supplied to the burner 3 during the expulsion process, the requirement for oxygen, and optionally also oil, being indicated by the temperature within the gas hood and the appearance of the flame at the mouth of the converter. Oxygen, and optionally also oil, may be supplied to the reactor vessel during the last 5-10 minutes of the expulsion process, to facilitate expulsion of any organic materials remaining. When all organic material has been burned, the temperature in the reactor vessel is raised to 1050°-1100° C., by means of the burner 3, so as to partially smelt metals present in the scrap material. The reactor vessel is then emptied of its contents into ladles (not shown) located beneath the reactor and there permitted to cool, the treated scrap material being obtained in the form of dust-free pourous lumps held together by a solidified metal layer in the bottom of the ladle. From the handling aspect, the lumps suitably have a weight of from 4-5 tons, although larger lumps may also be permitted. The lumps may be charged directly to a copper converter during the matte blowing period. The combusted process gases are charged at a temperature of 700°-1000° C. and in an amount of about 30,000 Nm$^3$/hour to a venturi wash, where the chlorine contained by the gas is dissolved in water and the dust separated from said gas at the same time, said dust being obtained in the form of a sludge which is passed to a thickener 11 through a line 10, for dewatering and neutralisation. Neutralisation is effected by means of a suitable alkali, for example lime or NaOH. Dewatered sludge is removed from the thickener at 12. Part of the neutralised, clear water obtained in the thickener 11 is passed back to the venturi wash 9 as washing water, through lines 13, 14. When equilibrium prevails in the gas-purifying system, the ingoing venturi water contains approximately the same amount of impurities as the withdrawal through line 17. It is possible, however, to separate additional sludge from the clear water in the thickener 15, enabling a sludge 16 to be tapped therefrom. Gas treated in the venturi wash 9 is passed to a cyclone 19 through a line 18, particles separated in the cyclone being transferred to the venturi-sludge thickener 11 through a line 20 and line 10. The purified gas is passed by means of a fan 22 and a line 21 to a 60 meter high chimney 23. The illustrated system also includes a ventilation-gas line 24 incorporating a duct filter 25, which proves that the gas leaving the process is so pure as to enable it to be discharged directly to atmosphere through a simple chimney system intended for gases having extremely low impurity contents.

EXAMPLE

A number of combustion tests and pyrolysis tests were carried out on different types of metal scrap in a plant of the kind described with reference to the drawing. The scrap was charged in all tests to a hot converter, and the oxygen-gas-oil ratio was 1.7–1.9 Nm³ oxygen gas/lit oil.

Test 1

4700 kg of tele-station material were worked-up, the pyrolysis process being initiated by charging about 10 liters of oil and oxygen gas to the burner. The converter was then rotated without supplying additional oxygen thereto. Air was charged to the converter during the last 15 minutes of the test, in order to partially combust residual organic material. The time taken to totally expel the organic material present was 60 minutes.

Test 2

4200 kg of a similar material to that used in Test 1 were charged to the converter. 20 liters of oil were charged at the beginning of the process. During the first 20 minutes of the test an oil burner was operated in the gas hood and no air was charged to the converter. 25 minutes after the start, air was charged to the converter through a lance, the "pyrolysis process" being stabilised. The total pyrolysis and combustion time was 55 minutes.

Tests 3–5

5–7 tons of scrap material were treated, of which material ⅔rds was fragmented electronic scrap and ⅓rd cable scrap, an oil supply of 2–3 lit/min being sustained during the first 5–10 minutes of the tests. Air was introduced to the reactor through a lance during the whole of the test period. When shown to be necessary, e.g. by the temperature within the gas hood and the appearance of the nozzle flame, oil was supplied to the burner in a manually controlled fashion. 50–70 liters of oil were used during a total treatment time of 80–100 minutes.

Test 6

This test was carried out in substantially the same manner as Tests 3–5, but with the difference that an oil burner consuming 1 liter of oil per min. was operated in the gas hood, so as to obtain a more effective final combustion of the combustible substances fumed off. 93 liters of oil were used in the converter during a total treatment time of 100 minutes.

The dust content of the process gases and chimney gases generated during the tests was measured. The dust content upstream of the venturi varied between 3 and 5 kg/hr. The lowest value was obtained when the oil burner was in operation in the gas hood. The dust content of the process gas, however, is only of secondary interest. The primary interest lies in the dust content of the chimney gas, which varied between 0.4 and 0.8 kg/hr. Thus, dust emission lay at a very low level. Assuming that the dust-content of the gas is on average 0.5–1.0 kg/hr, this will correspond to a dust emission of 0.2–0.3 kg dust per ton of scrap material, which is extremely favourable when compared with emission of about 10 kg dust per ton of scrap material obtained with the existing scrap-combusting plant at Rönnskärsverken.

The metal losses are extremely negligible compared with existing combustion methods. On the basis of those tests carried out hitherto, copper losses can be estimated as being 2–10 kg/ton scrap and the silver losses as being 5–50 gr Ag/ton scrap. In our experience, however, these low figures can be expected to fall when the necessary fine adjustments have been made to the plant.

We claim:

1. A method for converting metal-containing waste products having a substantial organic content to a reacted product from which metal can be readily recovered, comprising the method steps of introducing the waste products to a reactor vessel having a closed bottom and a longitudinal axis and arranged for rotation about its longitudinal axis; intermittently unloading reacted product and subsequently loading a refill of said waste product through a common charge and discharge opening at a top end of the reactor vessel; maintaining the products at a controlled temperature range sufficiently high to maintain an expulsion process to expel organic constituents in the form of a combustible gas, said temperature being maintained while rotating the reactor vessel at a predetermined controlled speed with said axis inclined to the horizontal at an angle of less than 90° for as long as such a gas continues to be generated; continuously combusting the combustible gas at a location external of the reactor vessel; and unloading the reacted product from the reactor vessel in a molten and/or non-molten state.

2. A method according to claim 1, including the method step of supplying air or other gas containing free oxygen to the reactor vessel via a lance in a substoichiometric quantity during at least part of the expulsion process.

3. A method according to claim 1, characterized by combusting the combustible gas in a combustion chamber having a lower opening located adjacent the opening of the reactor vessel.

4. A method according to claim 3, characterized by introducing air, or other gas containing free oxygen, through a gap defined by the reactor opening and the lower opening of the combustion chamber, in order to sustain a combustion process.

5. A method according to claim 1, characterized by controlling the expulsion of combustible gas by controlling a speed of rotation of the reactor vessel, and increasing the rotary speed of said reactor vessel when it is desired to increase the flow of combustible gas.

6. A method according to claim 1 including the step of initially heating the waste products with a burner directed down through the opening of said reactor vessel, in order to initiate the expulsion process.

7. A method according to claim 1, characterized in that the expulsion process is carried out at a temperature of about 600°–800° C.

8. A method according to claim 1 including the method step of increasing the temperature in the reactor vessel subsequent to termination of the expulsion process, and when the generation of combustible gas ceases, in order to at least partially melt metals present in the loaded waste products.

9. A method according to claim 8, wherein the step of unloading the reacted product of the reactor vessel is completed by removing the reacted content in a partially molten state.

10. A method according to claim 9, wherein the step of unloading comprises emptying the residual reacted content of the reactor vessel into a ladle, and permitting said content to cool to form a solid lump, so as to bind any non-molten material present in said residual reactor content.

11. A method for treating and upgrading metal scrap which contains substantial amounts of combustible and organic matter, by heating-treating the metal scrap in a cycle using a rotary type inclined reactor vessel having closed bottom, said method comprising the steps of:

introducing a single predetermined amount of charge of the metal scrap for each said cycle from a top opening of the reactor vessel;

applying a preliminary source of heat through the reactor top opening for starting combustion of combustible matter in the metal scrap to remove the combustible matter substantially in the form of gas;

selectively supplying oxygen/air through a lance inserted from the reactor opening and controlling combustion of said combustible matter to continue and remain at sub-stoichiometric levels;

controlling the temperature of the reactor inside to be within the predetermined range;

rotating the reactor vessel about its inclined axis at a predetermined speed range, and varying the speed of rotation to increase the speed as a function of a volume of combustible gas desired to be generated;

continuing said sub-stoichiometric level of combustion and controlled rotation of the reactor vessel till gas generation from said combustible matter has substantially ceased;

combusting said generated gas in a chamber which is disposed to receive said gas directly from the reactor opening;

selectively applying increased heat to said charge in the reactor vessel when gas generation has substantially ceased; and unloading said charge in treated upgraded form for further purification treatment and recovery of metal.

* * * * *